Jan. 26, 1965   H. B. EGLESTON   3,166,994
ROTATING CARTON TUCKER APPARATUS
Filed Nov. 3, 1961   8 Sheets-Sheet 1

INVENTOR.
HARRY B. EGLESTON
BY
Frank B. Hill
AGENT

Jan. 26, 1965  H. B. EGLESTON  3,166,994
ROTATING CARTON TUCKER APPARATUS
Filed Nov. 3, 1961  8 Sheets-Sheet 2

Fig. 2

INVENTOR.
HARRY B. EGLESTON
BY
Frank B. Hill
AGENT

Fig. 3

INVENTOR.
HARRY B. EGLESTON
BY
Frank B. Hill
AGENT

Jan. 26, 1965  H. B. EGLESTON  3,166,994
ROTATING CARTON TUCKER APPARATUS
Filed Nov. 3, 1961  8 Sheets-Sheet 4

INVENTOR.
HARRY B. EGLESTON
BY
Frank B. Hill
AGENT

Jan. 26, 1965   H. B. EGLESTON   3,166,994
ROTATING CARTON TUCKER APPARATUS
Filed Nov. 3, 1961   8 Sheets-Sheet 5

INVENTOR.
HARRY B. EGLESTON
BY
Frank B. Hill
AGENT

Jan. 26, 1965     H. B. EGLESTON     3,166,994
ROTATING CARTON TUCKER APPARATUS Filed Nov. 3, 1961     8 Sheets-Sheet 6

INVENTOR.
HARRY B. EGLESTON
BY
Frank B. Hill
AGENT

Jan. 26, 1965

H. B. EGLESTON 3,166,994

ROTATING CARTON TUCKER APPARATUS

Filed Nov. 3, 1961

INVENTOR.
HARRY B. EGLESTON
BY
Frank B. Hill
AGENT

United States Patent Office 3,166,994
Patented Jan. 26, 1965

3,166,994
ROTATING CARTON TUCKER APPARATUS
Harry B. Egleston, Livonia, Mich., assignor to Ex-Cell-O Corporation, Detroit, Mich., a corporation of Michigan
Filed Nov. 3, 1961, Ser. No. 149,925
6 Claims. (Cl. 93—44.1)

This invention in general relates to paperboard container forming and filling machines and particularly to the paperboard container end closing means on the forming and filling machines. As hereinafter described this invention is more specifically directed to an apparatus and method for closing a container end and putting it in such a condition as to be permanently bonded together at almost the same instant.

Thermoplastic coated paperboard containers are being used in increasing quantities as fluid containing bottles in place of other commonly used means. The success of the new container has caused much demand for new equipment and/or the converting of existing equipment to handle its construction. In an effort to hold down the cost of new equipment and the characteristics which limit the system available for converting existing equipment the present disclosure was invented. The consideration given to accomplish these goals was mainly governed by the limited number of positions available to perform the required operations, need for keeping all functional stations easily accessible to operators for repair and normal maintenance, limited allowable time between the heating station and the sealing station of the end closure, etc. The machines to be converted are limited as to the number of bridge support sections available for attaching new equipment to handle the new container. The older container was disclosed in U.S. Patent No. 2,750,095 issued June 12, 1956 on the application of Carroll R. Alden (Reissue No. 25,021 issued August 3, 1961). The new container's end closure is disclosed in U.S. Patent No. 3,120,335 issued February 4, 1964. The method of bonding the new container end closure is different then the method used to close the old container. To allow the existing machines to be converted and new machines to be constructed at a reasonable material cost, and time, a method of utilizing all the present bridge support members without requiring additional members was needed.

The major objective of the present invention is to provide a new and improved means of tucking the end closure flaps of a thermoplastic coated paperboard container.

Another objective of the present invention is to provide an apparatus to tuck the flaps of the end closure of a thermoplastic coated paperboard container while it is moving from one station to another.

Another objective of the present invention is to provide for end closure flap tucking between the last heating station and the next station which will be the first bonding station.

Also, the objectives of the present invention include the provision of a structure capable of accomplishing the above objectives with a minimum of material cost and fabricating expense, and at the same time being composed of simple and ruggedly constructed elements which are very reliable in operation.

Other objectives and advantages of the invention will be apparent from the following detailed description and claims, taken in connection with the accompanying drawings which form part of the instant specification, and which are to be read in conjunction therewith, and in which like reference numerals are used to indicate like parts in various views.

While the invention is susceptible of various modifications and alternative constructions, certain illustrative embodiments have been shown in the drawings and will be described below in considerable detail. It should be understood, however, that there is no intention to limit the invention to the specific forms disclosed, but on the contrary, the intention is to cover all modifications, alternative constructions and equivalents falling within the spirit and scope of the invention as expressed in the appended claims.

GENERAL MACHINE DESCRIPTION

Figure 1:
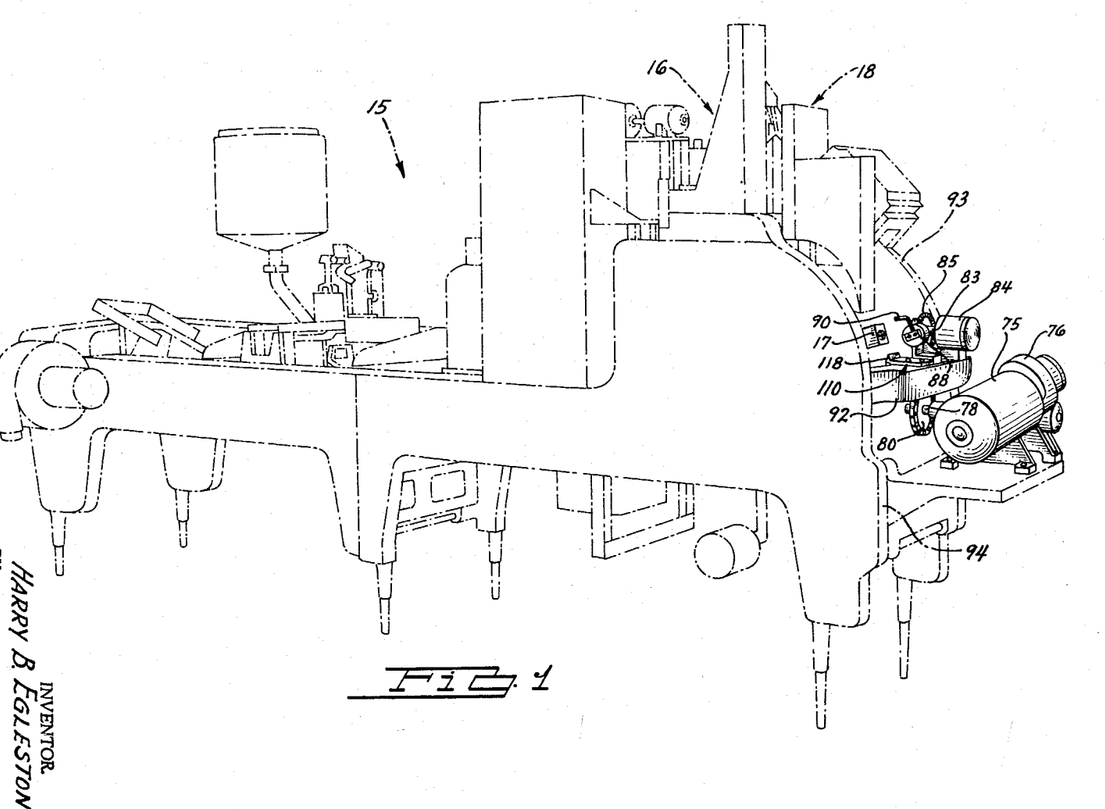
FIG. 1 is a perspective side view of the rotating carton tucker apparatus as it is used on a forming and filling machine shown here in phantom.

The forming and filling machine generally indicated as 15 in FIG. 1 is similar as to requirements as the forming and filling machines disclosed in United States Patent No. 3,002,328 issued October 3, 1961. The present machine is adapted to receive a supply of flattened side seamed blanks similar to the one shown in FIG. 12. A flattened side seamed blank is removed from the supply of blanks and loaded on a rotary mandrel assembly unit. The mandrel assembly is rotated by indexing through various stations at which time one closure end, in the present case the bottom, is formed and bonded. Before the mandrel assembly is again at the loading position the container is stripped from the mandrel and passes through a series of operations which prebreaks the top flaps, fills the container, heats, and seals the top close. Then the container is ejected from the end of the machine as a completed carton and is ready for delivery to the consumer.

GENERAL LOADER AND MANDREL DESCRIPTION

Figure 3:
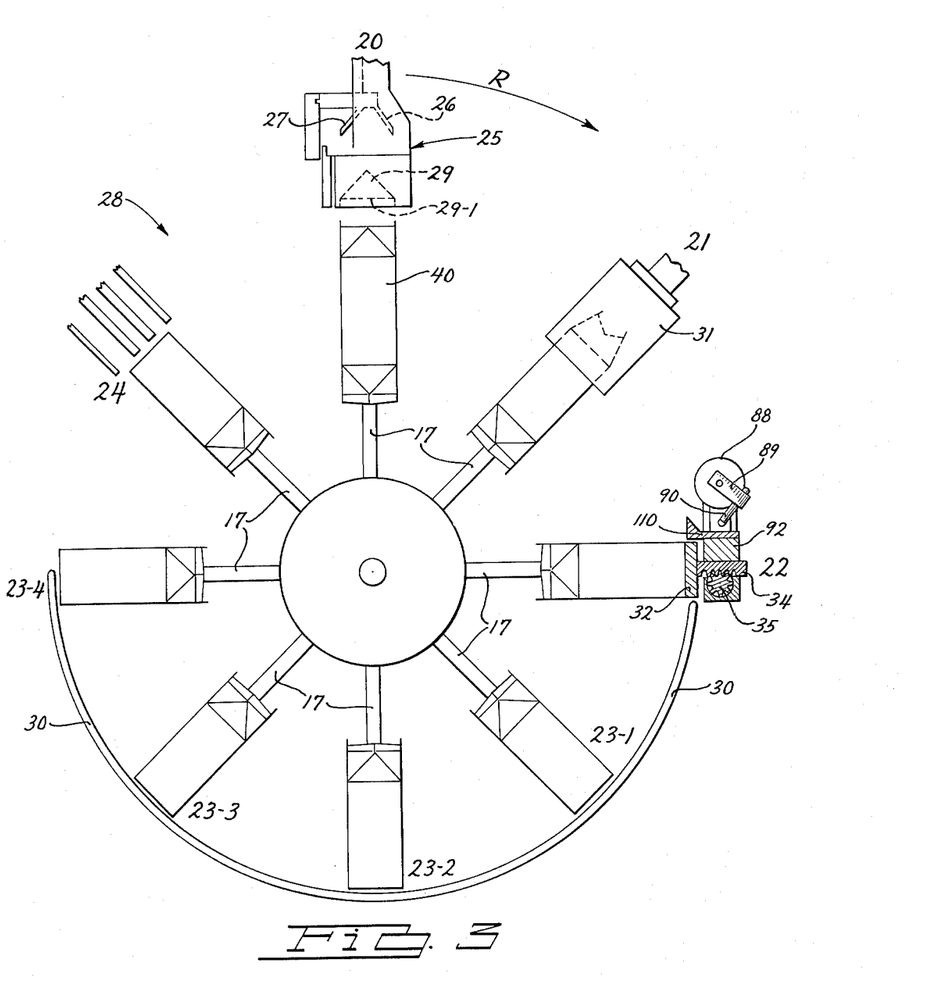
FIG. 3 is a side elevational view of the mandrel assembly of the forming and filling machine including various associated units for operating on the carton at different stations along its path of movement.

Referring generally to FIGS. 1 and 3, the supply of blanks are indicated as 16, but not in view as seen in FIG. 1. One blank at a time is removed from the supply of blanks 16 and loaded on a mandrel 17 by loader system 18. The blank is loaded on the mandrel 17 when it is at load station 20. The mandrel assembly 28 rotates in a clockwise direction as indicated by arrow R in FIG. 3. After the container 40 is loaded on the mandrel 17 the mandrel assembly 28 is rotated, moving the newly loaded mandrel to heat station 21, where the container's end is heated to a sufficient temperature to activate the thermoplastic coating of the container's end closure to allow bonding as disclosed in U.S. Patent No. 3,120,335 issued February 4, 1964. The assembly 28 is then indexed to forming and bonding station 22. This station is the station which encompasses my present invention and will be explained in detail later in the disclosure. At this station the end closure is tucked, formed and bonded. The container is then rotated through idle stations 23-1, -2, -3 and -4 to stripping station 24. At this station the container is removed from the mandrel which can be accomplished by a blast of air from the end of the mandrel or mechanical means catching the top of the container and throwing it off, as examples, and continues through the other operation as covered in general machine description.

CONTAINER DESCRIPTION

Figure 11:
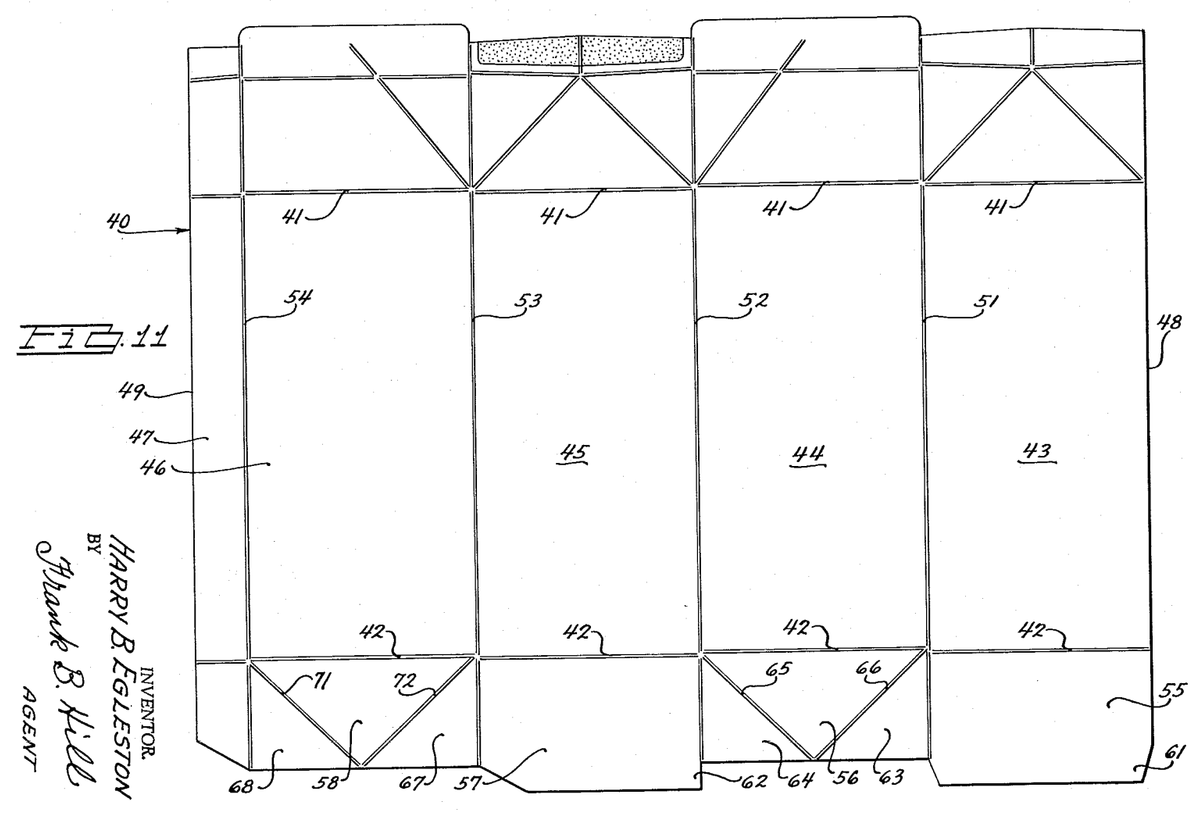
FIG. 11 is a layout view of a blank from which the cartons are erected and showing the inside surface thereof.

Referring more specifically to FIG. 11 where the container 40 is in flat blank form with a pattern of appropriate score lines and having the inside surface of the blank showing. The container is separated into three groups by score lines 41 and 42. The material above score line 41 is the top closure, a discussion of which is not necessary for disclosure of the present invention, however, a complete disclosure is given in my copending application U.S. S.N. 122,571 filed July 7, 1961. The material between score lines 41 and 42 is the body group and comprises four panels, 43 through 46 and side seam flap 47. The body group is defined on the sides by edges 48 and 49 and with the panels being separated by score lines 51 through 54. The material below score line 42 is the bottom closure group and comprises bottom closure panels 55 through 58 and side seam flap 47. The bottom closure group defined on the sides by the edges 48 and 49 and the panels are separated by the score lines 51 through 54. The bottom closure panel 55 has an extended tuck-in flap 61 and bottom closure panel 57 has an extended tuck-over flap 62. The bottom closure panel 56 is flanked by triangular fold-back panels 63 and 64 and connected thereto by score lines 66 and 65 respectively. The bottom closure panel 58 is flanked by triangular fold-back panels 67 and 68 and connected thereto by score lines 72 and 71 respectively.

Figures 12, 13, 14:
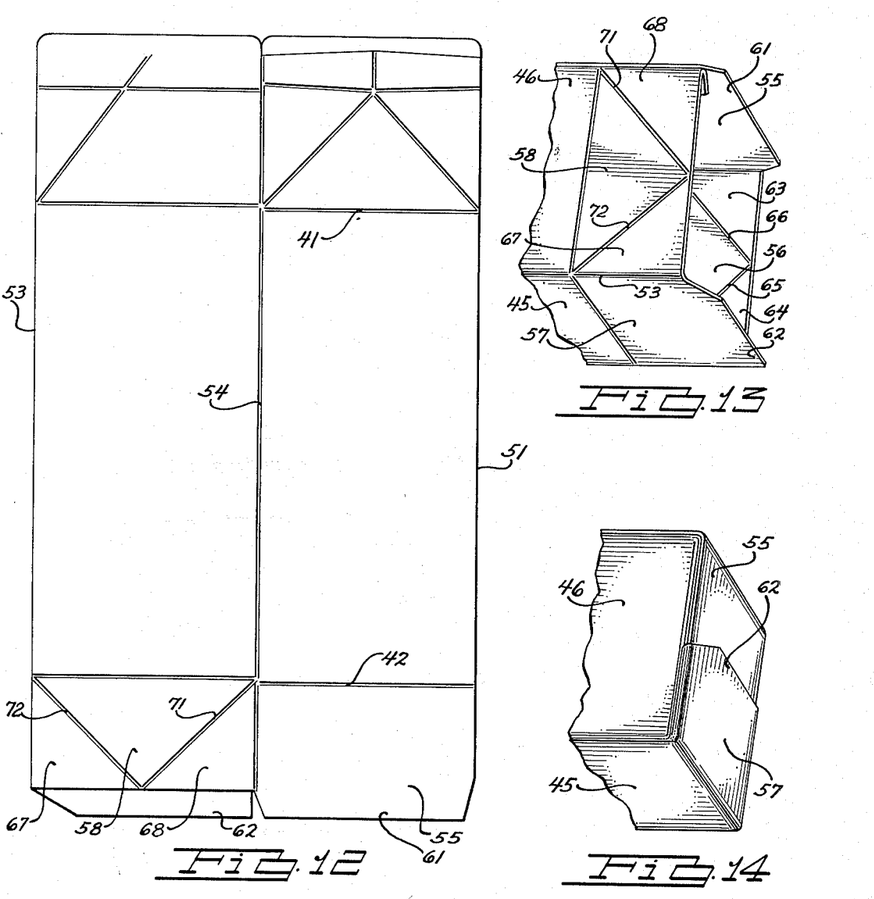
FIG. 12 is a flat side seamed blank made from the blank shown in FIG. 11 and showing the outside surface thereof.
FIG. 13 is a perspective view of the carton end closure in tubular form as it appears when first mounted on the mandrel assembly.
FIG. 14 is a perspective view of the carton end closure after it has been formed and bonded.

To form a flat side seamed blank as presented to the forming and filling machine 15 the panel 46 and side seam flap 47 would be folded about score line 53 until they contact panels 45 and 44 respectively. The panel 43 would be folded about score line 51 until it contacts the inside surface of panel 44 and the outside surface of side seam flap 47. The surface along edge 48 which will meet the outside edge of the seam flap will be heated to activate its coating and the outside surface of the side seam flap will be heated to activate its coating so that when the two surfaces meet they will be bonded together upon cooling. Pressure is usually applied to secure the best possible bond. The edge 48 and the score line 54 now appear as one line. The flat blank container 40, shown in FIG. 11 looks like flat side seamed container 40, as shown in FIG. 12, after it is side seamed. It is thus ready to be supplied to a forming and filling machine.

When the container 40 is loaded on the mandrel 17 it takes a tubular shape as seen in FIG. 13. To form the bottom the panels 55 and 57 are moved towards each other. Also, the panels 56 and 58 are moved towards each other. This causes fold-back panel 67 to rotate around score line 53 so that the inside surface of panels 67 and 57 are coming together. At the same time panel 67 is rotating around score line 72 thus the outside surfaces of panels 68 and 58 are coming together. Fold-back panels 63, 64 and 68 make the same movements as panel 67 with panels 55–56, 56–57 and 55–58, respectively. Bottom closure panel 55 moves towards bottom closure panel 57 just enough faster than panel 57 moves towards panel 55 so that tuck-in flap 61 is positioned between fold-back panels 64–67 and panels 57–62. After the bottom closure is completely formed it appears as shown in FIG. 14.

GENERAL DESCRIPTION OF POWER DRIVE

The power source for the forming and filling machine is an electric motor 75 which has a gear reducer 76 which transmits power along shaft 78. This shaft has barrel cams, gears, etc. to transmit the power and to keep the forming and filling machine in time.

Referring to FIGS. 1, 2, 5, 6, and 7 a driven gear 80 is secured to and driven by shaft 78. Gear 80 drives driven gear 81 by means of chain 82. Gear 81 is secured to shaft 83 which is supported by housing 84. Bevel gear 85 is also secured to shaft 83 and drives pinion level gear 86 which is secured to one end of shaft 87. Shaft 87 is supported by housing 88. At the opposite end of shaft 87 from gear 86 is secured tucker arm block 89 which holds and notates tucker arm 90 as it rotates.

Figure 5:
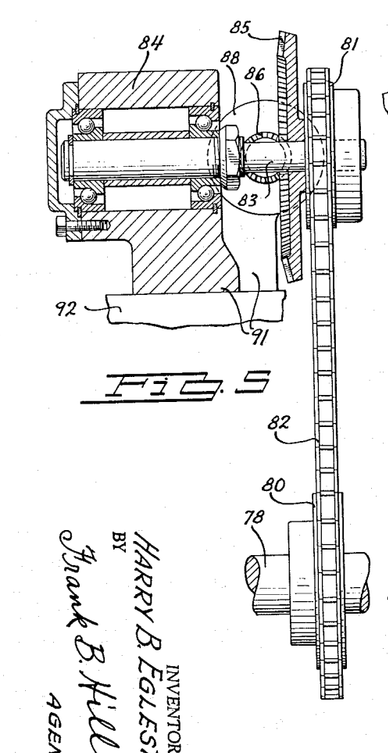
FIG. 5 is a partial sectional side view of the power drive for the rotating carton tucker apparatus.
Figure 6:
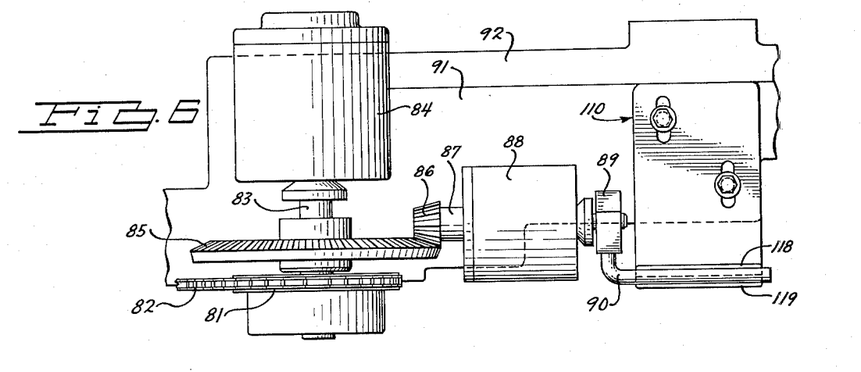
FIG. 6 is a plan view of the power drive system for the rotating carton tucker apparatus.
Figures 7, 8:
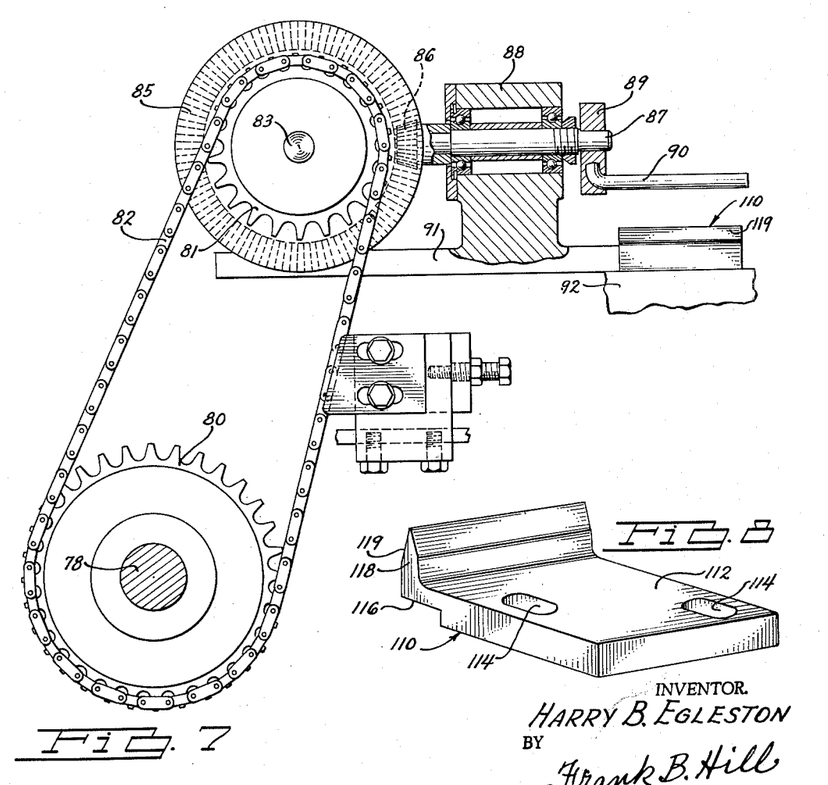
FIG. 7 is an end elevation view of the power drive system for the rotating carton tucker apparatus.
FIG. 8 is a perspective view of the tucker shoe.

Housing members 84 and 88 are secured to and held by base 91. Base 91 is in turn contacted to bridge member 92 which is supported at its ends by side supports 93 and 94.

Figure 9:
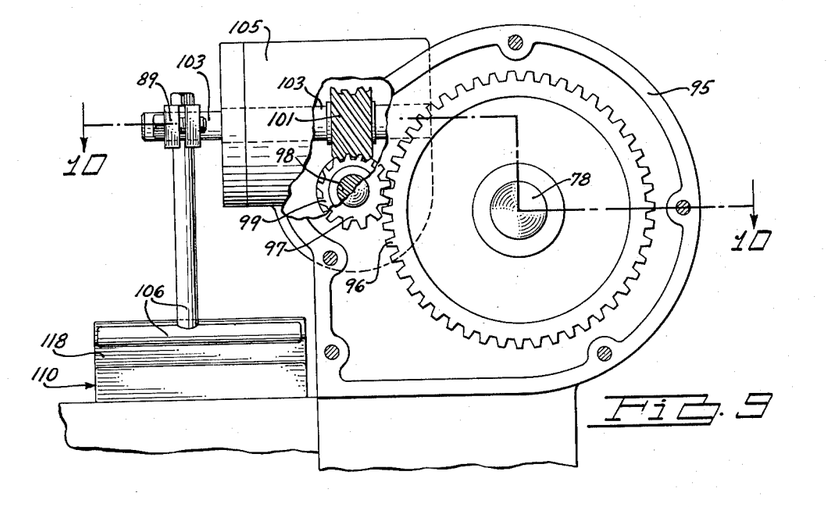
FIG. 9 is an end view in partial section of an alternate power drive means taken along line 9—9 in FIG. 10.
Figure 10:
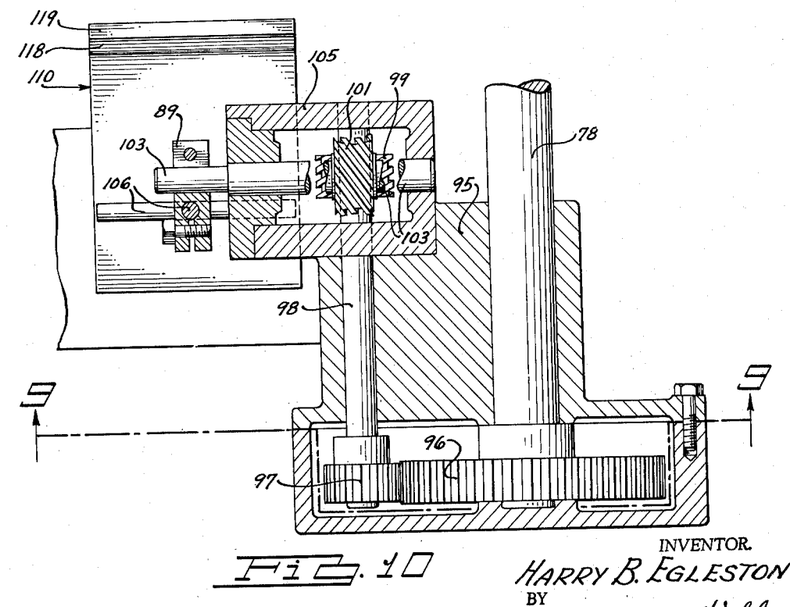
FIG. 10 is a plan view in partial section of an alternate power drive means taken along line 10—10 in FIG. 9.

An alternate power supply means are shown in FIGS. 9 and 10. In certain applications the electric motor 75 may be required to be in another location, such as inside the front of the machine between side supports 93 and 94. The power is supplied by a shaft 78 which is journalled in housing 95. Spur gear 96 is secured to the end of shaft 78 and drives pinion gear 97. Gear 97 is secured to shaft 98 which also journalled in housing 95. At the opposite end of shaft 98 from gear 97 is helical gear 99 which drives helical gear 101. Gear 101 is secured to shaft 103 which is supported by housing 105. At the end of shaft 103 furthest from gear 101 is tucker arm block 89 which holds and rotates tucker arm 106.

GENERAL DESCRIPTION OF THE TUCKER OPERATION

Figure 2:
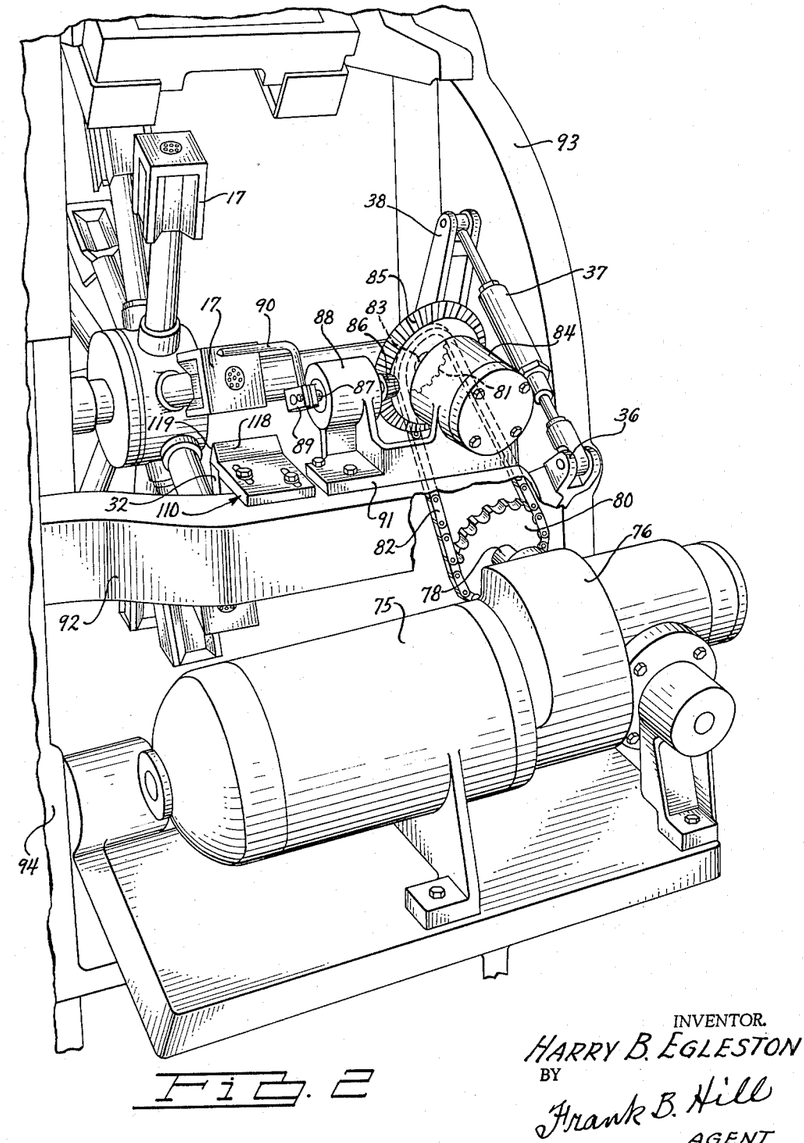
FIG. 2 is a perspective end view of the forming and filling machine showing the rotating carton tucker apparatus and mandrel assembly in close-up.

The discussion of this topic will be referring principally to FIGS. 3, 4 through 4c, and 8. The power supply is so geared connected to the tucker arm 90 that it is rotating continuously and at such a speed it will be traveling slightly faster then the container end closure as it indexes from station 21 to 22. The container 40 is loaded on the mandrel 17 at station 20, prebreaker 25 is lowered with cam plates 26 and 27 contacting bottom closure panels 57 and 55 respectively and camming them towards each other at the same time breaker plates 29 (one on each side of the loaded container) are rotated towards each other about hinges 29-1 contacting bottom closure panels 56, 58. These bottom closure panels are moved far enough so that score lines 42, 51 through 54, 71, 72, 65 and 66 are pre-broken enough to permit proper forming of the bottom at station 22. After the container is loaded on the mandrel and the pre-breaking operation is completed the mandrel assembly is indexed to station 21 where the bottom closure panels are placed in heater unit 31. At this station the thermoplastic coating is heated to such a temperature it is activated enough to permit bond at a station 22. The assembly 28 is then indexed to station 22. During this movement from station 21 to station 22 the bottom is formed. After it is positioned at station 22 the pressure pad 32 acts on the bottom closure panels forcing the thermoplastic coated surfaces together under pressure between the pad and the mandrel end thus securing a good bond between these surfaces. The pad 32 is mounted on the end of rack 34 which is actuated by pinion 35. The pinion 35 is one end of a shaft that runs from the middle of bridge member 92 to its right end, as seen in FIG. 2, where it is secured to lever 36. Adjustable linkage 37 connects lever 36 with lever 38. Lever 38 pivots about a fulcrum (not shown) between the end connected to linkage 37 and the other end. The other end (not shown) has a roller follower which is controlled by a barrel cam on shaft 78. When the container 40 is in position at station 22 the barrel cam will force the follower of lever 38 towards the motor 75 thus causing the linkage connection end of lever 38 away from the motor which also moves the linkage 37 and rotates the lever 36 away from the motor 75. This rotates the shaft with the pinion 35 in a counter-clockwise direction, as seen in FIG. 3, applying pressure to the container bottom causing the bonding action and giving it a cooling action too.

A tucking shoe 110 shown in FIG. 8 has a body 112, two elliptical bolt holes 114 for adjustable positioning of the shoe on the bridge member 92, undercut 116 for receiving the pressure pad 32, and a camming edge 118 with camming surface 119 for controlling bottom closure panel 57.

Figure 4:
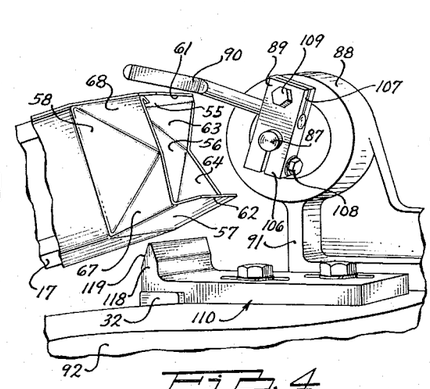
FIG. 4 is a perspective side view of the rotating carton tucker apparatus as the mandrel is indexing and before the tucker arm on the tucker shoe contacts the mounted carton.
Figure 4A:
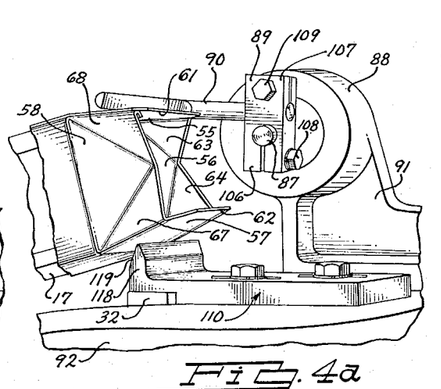
FIG. 4a is a perspective side view similar to FIG. 4 but now with the tucker arm contacting the mounted carton.
Figure 4B:
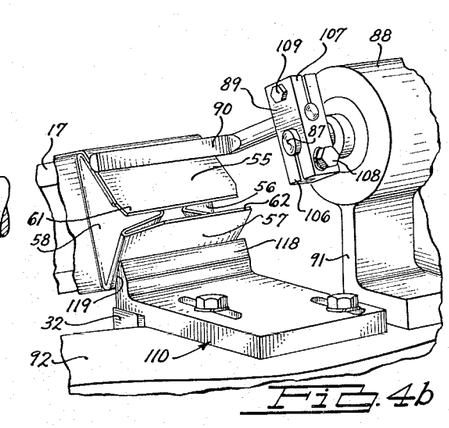
FIG. 4b is a perspective side view similar to FIG. 4 with both the tucker arm and the tucker shoe contacting the mounted carton.
Figure 4C:
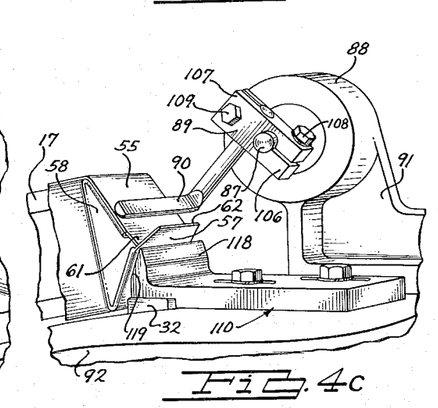
FIG. 4c is a perspective side view similar to FIG. 4b with the tuck-over flap just covering the tuck-in flap.

Before the container arrives at position 22 the bottom is tucked and formed as shown in FIG. 4 through 4c. As mentioned earlier the power source to the tucker arm 90 has been so geared that the tucker arm is moving a little faster than the bottom closure panel 55 which it contacts. FIG. 4 shows the container in position just before it contacts the cam edge 118 and before the tucker arm 90 contacts it. As the mandrel 17 continues to rotate, as seen in FIG. 4a the tucker arm 90 touches bottom closure panel 55 and starts moving it towards panel 57. Because of the pre-breaking action at station 20 panels 56 and 58 are bent toward each other enough so that as the panel 55 starts in the direction of panel 57 they will start moving inwardly. The mandrel continues to move the container towards the shoe 110 so that panel 57 contacts the camming edge 118 as seen in FIG. 4b and starts forcing it towards panel 55. The tucking arm 90 continues to move panel 55 faster than the mandrel is moving, therefore, the panel 55 is bent around score line 42 towards panel 57 more than panel 57 is bent around score 42 towards panel 55. This causes a pocket to start forming between panel 57 and panels 64 and 67 to receive the tuck-in flap 61. The next phase of the tucking, as seen in FIG. 4c, is when the tuck-in flap 61 enters the pocket formed by panels 57, 64, and 67. The panel 57 is being acted upon by camming surface 119 and as the mandrel continues to rotate the tucker arm will rotate out of contact with panel 55 and the tuck-over flap 62 will act on the tuck-in flap 61 by the action of the camming surface 119 causing the bottom to be formed as shown in FIG. 14. As the bottom is formed the mandrel will stop its rotation when alined with the pressure pad 32. The pad 32 is so located that the formed bottom slides right over its face which prevents the bottom from opening up before the pressure pad action on the bottom closure making a good bond between the heated thermoplastic coated panels. After the bottom is formed the mandrel continues to index around to station 24 and the container is prevented from dropping from the mandrel by guide rails 30.

The tucker arm 90 is adjustable angularly, axially, circumferentially, and radially as shown in FIG. 4b. The tucker arm block 89 has bifurcated ends 106 and 107. End 106 allows the block 89 to slide along shaft 87 for axial position and around shaft 87 for angular location. When the block 89 is in correct position both angularly and axially bolt 108 is tightened to secure it to the shaft 87. End 107 allows the tucker arm 90 to be moved inward and outward from block 89 for proper radial position and it also allows the arm 90 to be revolved for various circumferential angular positions. When the arm is at the desired location the bolt 109 is tightened securing it to block 89.

The operation of the tucker arm 106 with the tucker shoe 110 showing an alternate power source system in FIGS. 9 and 10 is the same as just discussed, therefore, it will not be covered separately.

Due to different characteristics of containers because of material, coating, processing, etc., it may be required at times to provide means to prevent panels 44 and 46 from bulging when panels 55 and 57 are acted upon by tucker arm 90 and camming edge 118 respectively. This could cause the bottom closure panels 56 and 58 to pop outward instead of inward. This can be prevented by putting guide plates along both sides of tucker shoe 110 and extending out past the camming edge 118 and just beyond the path score line 42 follows. The guide plates will be far enough apart to allow the mandrel and loaded container to pass between them. They will extend high enough to act along score line 42 adjacent panels 56 and 58 when tucker arm 90 starts contacting panel 55. The guide plates will curve up from tucker shoe 110 so as not to interfere with the rotation of tucker arm 90. This same principle can be utilized with the use of only one guide plate and it can be applied to either side of tucker shoe 110.

While the embodiments of the present invention as herein disclosed constitute preferred forms, it is to be understood that other forms might be adopted.

I claim the following as my invention:

1. A trucking and bonding station for a high-speed carton fabricating machine and adapted to operate on the end closure panels of each carton produced in said machine, said apparatus comprising:

two side support members,
a rotatable mandrel assembly with more than one mandrel supported by said side supports,
a bridge member supported by said side supports,
a power source driving a power transmitting system,
said power transmitting system connected to said bridge member,
a tucker arm driven and supported by said power transmitting system,
a tucker shoe having a camming edge and a camming surface and being supported by said bridge member,
said mandrel rotates in such a manner that when a container is mounted on it the tucker arm will act on one end closure panel and said tucker shoe camming edge will act on a second end closure panel, and said tucker shoe camming surface will act on both panels bringing them together to form a closed end.

2. A tucking apparatus for a carton fabricating machine and adapted to operate on the end closure panels of each carton produced in said machine, said apparatus comprising:

a rotatable mandrel assembly with at least one mandrel and supported by said machine,
a power source driving a power transmitting system and both being supported by said machine,
a tucker arm is driven and supported by said power transmitting system,
a tucker shoe having a camming edge and a camming surface and is supported by said machine adjacent the tucker arm,
the said mandrel assembly rotates adjacent the tucker shoe and tucker arm in such a manner that when a carton is mounted on its mandrel the tucker arm will act on one end closure panel and the tucker shoe camming edge will act on a second end closure panel so the two end closure panels move toward each other, and said tucker shoe camming surface will act on both panels moving them together forming a closure end.
3. A tucking device as set forth in claim 2 having; a pressure pad adjacent to said camming surface and acts on said closure panels to bond them together.
4. A tucking device as set forth in claim 2 having; said tucker arm first moving toward said tucker shoe and then away in a timed relationship to the mandrel assembly's rotation.
5. A tucking device as set forth in claim 2 having; said tucker arm rotating in a timed relationship to the mandrel assembly's rotation.
6. A tucking device as set forth in claim 5 having; said tucker shoe stationarily supported by said machine.

References Cited in the file of this patent
UNITED STATES PATENTS

| | | |
|---|---|---|
| 1,844,661 | Kimball et al. | Feb. 9, 1932 |
| 2,192,950 | Widell | Mar. 12, 1940 |
| 2,390,120 | Peters | Dec. 4, 1945 |
| 2,625,778 | Wood | Jan. 20, 1953 |
| 2,929,183 | Magna | Mar. 22, 1960 |
| 3,002,328 | Monroe et al. | Oct. 3, 1961 |
| 3,064,542 | Terry | Nov. 20, 1962 |